United States Patent [19]

Lehmussaari et al.

[11] Patent Number: 4,957,565

[45] Date of Patent: Sep. 18, 1990

[54] PROCESS FOR PRODUCING STARCH FROM CEREALS

[75] Inventors: Anntí Lehmussaari, Rajmaki, Finland; Wim van der Ham, Hoevelaken, Netherlands

[73] Assignees: Dorr-Oliver Incorporated, Milford, Conn.; Alko Ltd., Helsinki, Finland

[21] Appl. No.: 106,209

[22] Filed: Oct. 9, 1987

[30] Foreign Application Priority Data

Nov. 11, 1986 [NL] Netherlands ............... 8602850

[51] Int. Cl.$^5$ ............... C08B 30/04; C08B 30/08
[52] U.S. Cl. ............... 127/68; 127/67; 127/65; 435/219; 435/201; 435/209
[58] Field of Search ............... 127/67, 65, 68; 435/219, 209, 201

[56] References Cited

U.S. PATENT DOCUMENTS 2,418,669  4/1947  Schilling ............... 127/67
4,089,745  5/1978  Antrim et al. ............... 435/209
4,428,969  1/1984  Goering et al. ............... 127/38

FOREIGN PATENT DOCUMENTS 0156921  9/1982  German Democratic Rep. ... 127/67

*Primary Examiner*—Chung K. Pak
*Attorney, Agent, or Firm*—Harold M. Synder

[57] ABSTRACT

A process for the production of starch from cereals includes the steps (a) subjecting dry-ground dehusked grains to enzyme treatment, (b) homogenizing the treated product (optional), (c) extracting starch from the homogenized product, leaving the fibre, (d) concentrating the starch to yield a crude starch fraction and process water, (e) separating proteins from the crude starch and (f) separating the crude starch into primary and secondary starch fractions. The process assures that solubles will be maximized so that drying can be accomplished primarily by evaporators rather than by other types of dryers.

2 Claims, 1 Drawing Sheet

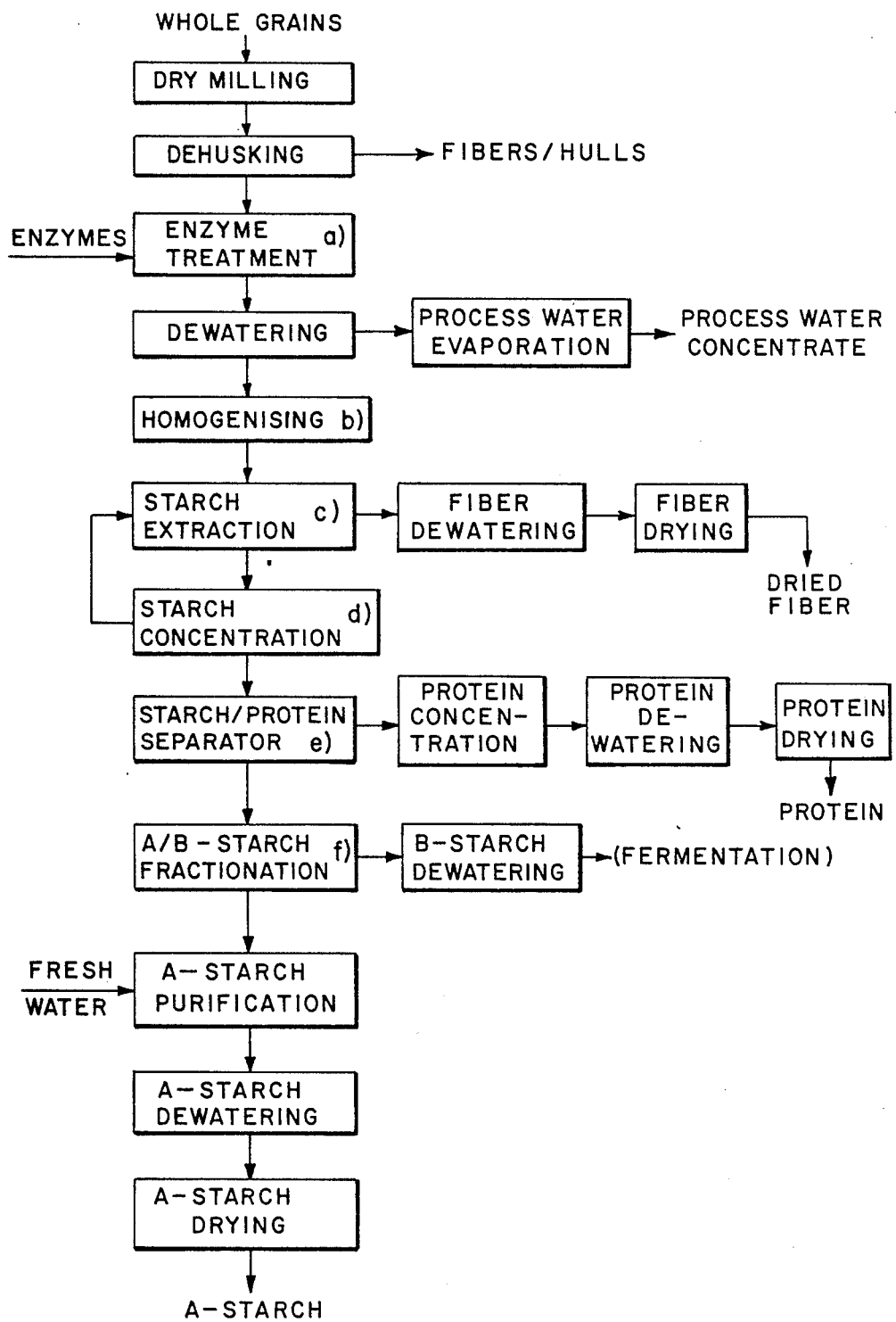

PROCESS FOR PRODUCING STARCH FROM CEREALS

FIELD OF THE INVENTION

The invention relates to a process for producing starch from cereals, especially from barley.

BACKGROUND

The Finnish patent No. 56.552 describes a procedure for producing starch from barley, in which the whole barley grains are steeped in water warmed to 40°–55° C., and containing 0.3% sulphur dioxide for 5–48 hours. The steeped grains are ground with process water so that the hull parts are left relatively intact and the endospermic part of the grains is comminuted into particles less than 0.1 mm in size. The ground barley is sifted with water and the starch is separated from the filtrate using the difference in sedimentation rate. The heavy starch fraction is washed and concentrated by a plurality of steps based on the difference in sedimentation rates.

In this process different fractions of products are obtained in the several different steps. The grains are separated to a starch fraction, a protein fraction, and a fibre fraction. Normally all products are dried to increase storage stability. This is accomplished by various types of dryers, or soluble fractions are dried by evaporators.

Several methods and agents have been used to improve the separation process, for example, pH adjustment or heat coagulation of proteins from process water.

U.S. Pat. No. 4,428,967 discloses a process for the production from barley of a maltose syrup as main product, comprising adding to barley flour and enzyme containing beta-glucanase and preferably also alpha-amylase. Beta-glucanase is added to partially hydrolyze the beta-glucans present and to reduce the viscosity to workable levels. The optional addition of alpha-amylase serves to initiate the hydrolysis of starch. This process provides starch of a relatively inferior quality, which is used as intermediate for the production of maltose syrup.

SUMMARY OF THE INVENTION

The present invention has the object among other things to change the mass balance in starch production so that the amount of solubles will be maximized to increase the amount of raw material leaving the process via an evaporator while proportionally the amount of raw material being dried in dryers is reduced. Maximizing the quantity of solubles is advantageous because the evaporation cost of water in an evaporator is far less expensive than the evaporation cost of water in dryers.

It is another object of the present invention to further improve the separation of the various product fractions.

According to the present invention a process is provided for producing starch from cereals which comprises the consecutive steps of:
 (a) subjecting dry-ground dehusked grains to an enzyme treatment,
 (b) optionally homogenizing the product obtained,
 (c) extracting the starch from the product obtained, leaving fibres,
 (d) concentrating the starch, giving a crude starch fraction and a process water fraction,
 (e) separating proteins from the starch obtained and
 (f) separating the crude starch obtained in a primary and secondary starch fraction.

The process of the invention has as advantages with respect to known processes, that more solutes are obtained, the separation of the different fractions is improved, less process water is needed, and more pure primary starch is obtained.

BRIEF DESCRIPTION OF THE DRAWING:

The drawing is a block diagram showing the various steps of the process and the order in which they take place as well as the products of the process.

DETAILED DESCRIPTION:

The following is an example of the process of the invention for producing starch from cereals in which the optional homogenization step following dewatering is employed:

Step a

The starting material is ground dehusked grains. Preferably for this purpose the whole grains are first dry milled and sifted, hulls and fibres being separated. The flour obtained is then mixed in a mixer in a ratio of 2.5/1 to 4/1 with process water heated to approximately 40–50° C., with the added enzyme mixture and with the entrained enzymes. Process water is defined as water recirculated from a down-stream process step. The slurry thus obtained is transferred to a tank wherein the enzyme action takes place. The enzyme treatment may vary in duration, but is conveniently about two hours.

The enzymes employed hydrolyze and solubilize compounds present in the grains such as proteins, beta-glucans, hemicelluloses and pectin, while starch is not affected at all. This action leads to a softening of cell structures and easier liberation of embedded starch granules resulting in a high starch yield. Hydrolyzing of a substantial amount of insolubles to solubles leads to improved mechanical dewatering of by-products, thus decreasing the amount of water to be evaporated therefrom in later stages. The principal enzymes employed are enzymes with proteolytic, cellulase, hemicellulase, beta-glucanase and pectinase activity. A suitable enzyme mixture is, e.g., Alko Econase 20, obtained from the microorganism Tricoderma viridae and comprising the above activities. The amount of enzyme mixture added is proportional to the required reaction time.

Step b

The dewatered product of the enzyme treatment is then homogenized.

Step c

Starch is extracted from the homogenized product by means of sieves which retain fibres and through with crude starch is passed. The starch extraction/fibre washing occurs in a plurality of stages in which the fibres are washed in countercurrent with a relatively small amount of washwater. The fibre fraction is dewatered and dried.

Step d

The raw starch fraction is concentrated, producing liquid-containing solubles (process water fraction) and a concentrated crude starch material. The process water fraction is partly evaporated, partly recirculated to the process. The product obtained by evaporating may be used, together with the above-mentioned fibres, as animal feed.

Step e

The proteins are separated from the starch material obtained, most conveniently by centrifuging. The protein fraction is concentrated, dewatered and dried.

Step f

The crude starch is separated in a primary (A) and a secondary (B) starch fraction by means of gravitation or centrifugal force, preferably in a multicyclone unit. Starch B is inferior in quality to starch A; starch B still contains protein. The starch B fraction is dewatered and may then be used conveniently for any production where the starch quality is not critical, e.g., in fermentation. The starch A fraction is washed, dewatered, and dried.

There follows comparative process runs of the prior art process and the process of the invention:

Prior Art Process 3 metric tons/hour of barley flour was processed with the conventional method without enzyme addition. After 24 hours running time, the process was stabilized and following mass-balance was measured and calculated for 1 ton of barley flour (dry-substance).

TABLE I

| Stream | Constituents of Barley Flour % of Original Raw Material Dry substance Basis | Solids Content After Dewatering % Dry Substance | Solids Content in Final Prod. % Dry Substance (After Evaporation to Commercial Standards) | Kg Water Evaporated |
|---|---|---|---|---|
| Process Water | 6 | 6 | 60 | 900 |
| Fibres | 24 | 30 | 90 | 533 |
| Protein | 16 | 25 | 90 | 462 |
| Starch | 54 | 68 | 85 | 159 |
| Total | | | | 2054 |

Process of Invention

The above prior art process was followed except that 1 kg of enzyme mixture was added for one metric ton of barley flour.

TABLE II

| Stream | Constituents of Barley Flour % of Original Raw Material Dry Substance Basis | Solids Content After Dewatering % Dry Substance | Solids Content in Final Prod. % Dry Substance (After Evaporation to Commercial Standards) | Kg Water Evaporated |
|---|---|---|---|---|
| Process Water | 12 | 10 | 60 | 1000 |
| Fibres | 21 | 35 | 90 | 367 |
| Protein | 13 | 30 | 90 | 289 |
| Starch | 54 | 68 | 85 | 159 |
| Total | | | | 1815 |

From the results as tabulated above it is seen that a very substantial reduction in kilograms of water evaporated is effected by the process of the invention; in fact, a reduction of above 11.5%.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for producing starch from cereals, characterized in that it comprises the consecutive steps of:
    (a) subjecting dry-ground dehusked grains to a treatment with an enzyme mixture such that the compounds present in the grains, except starch, are hydrolyzed and solubilized said enzyme mixture having proteolytic, cellulase, hemicellulase, beta—glucanase and pectinase activity, and substantially no alpha—amylase activity,
    (b) optionally homogenzing the product obtained,
    (c) extracting the starch from the product obtained, leaving fibres,
    (d) concentrating the starch giving a crude starch fraction and a process water fraction,
    (e) separating proteins from the crude starch fraction obtained and
    (f) separating the protein-free crude starch fraction thus obtained into a primary and secondary starch fraction.

2. A process for producing starch from barley, characterized in that it comprises the steps of:
    (a) dry milling and then sieving whole grains of barley to obtain dehusked grains,
    (b) subjecting the dry-ground dehusked grains to a steeping treatment with an enzyme mixture having proteolytic, cellulase, hemicellulase, beta-glucanase and pectinase activity, and substantially no alpha-amylase activity, whereby the compounds present in the grains, except starch, are hydrolyzed and solubilized,
    (c) optionally homogenizing the produce obtained,
    (d) extracting the starch from the product obtained, leaving fibres,
    (e) concentrating the starch giving a crude starch fraction and a process water fraction,
    (f) separating proteins from the starch obtained and
    (g) separating the crude starch obtained in a primary and secondary starch fraction.

* * * * *